US008126648B2

(12) United States Patent  (10) Patent No.: US 8,126,648 B2
Saltzer et al.  (45) Date of Patent: Feb. 28, 2012

(54) METHOD FOR PREDICTING THE BEST AND WORST IN A SET OF NON-UNIQUE SOLUTIONS

(75) Inventors: Rebecca L. Saltzer, Houston, TX (US); Christopher J. Finn, Missouri City, TX (US); Robert G. Keys, Houston, TX (US)

(73) Assignee: ExxonMobil Upstream Research Co., Houston, TX (US)

(*) Notice: Subject to any disclaimer, the term of this patent is extended or adjusted under 35 U.S.C. 154(b) by 547 days.

(21) Appl. No.: 11/922,817

(22) PCT Filed: Jun. 26, 2006

(86) PCT No.: PCT/US2006/024713
§ 371 (c)(1),
(2), (4) Date: Jun. 30, 2009

(87) PCT Pub. No.: WO2007/008382
PCT Pub. Date: Jan. 18, 2007

(65) Prior Publication Data
US 2009/0299638 A1 Dec. 3, 2009

Related U.S. Application Data

(60) Provisional application No. 60/698,760, filed on Jul. 13, 2005.

(51) Int. Cl.
*G01V 9/00* (2006.01)
(52) U.S. Cl. .............................................. 702/11; 703/5
(58) Field of Classification Search .......... 702/6, 11–14, 702/189; 703/5
See application file for complete search history.

(56) References Cited

U.S. PATENT DOCUMENTS

| 5,077,697 | A | 12/1991 | Chang |
| 5,659,135 | A | 8/1997 | Cacas |
| 5,675,147 | A | 10/1997 | Ekstrom et al. |
| 5,828,981 | A | 10/1998 | Callender et al. |
| 5,869,755 | A | 2/1999 | Ramamoorthy et al. |
| 6,044,327 | A | 3/2000 | Goldman |
| 6,061,300 | A | 5/2000 | Yamamoto |
| 6,088,656 | A | 7/2000 | Ramakrishnan et al. |
| 6,091,669 | A | 7/2000 | Chen |

(Continued)

FOREIGN PATENT DOCUMENTS
WO WO2007/001759 1/2007

OTHER PUBLICATIONS

Backus, M.M., (1987), "Amplitude Versus Offset: Review", Society of Exploration Geophysicists Annual Meeting Abstracts, Session: S10.7, pp. 359-364.

(Continued)

*Primary Examiner* — Manuel L Barbee
(74) *Attorney, Agent, or Firm* — ExxonMobil Upstream Research Co. Law Dept.

(57) ABSTRACT

Method for determining best and worst cases for values of model parameters such as porosity and shale volume fraction generated by non-unique matrix inversion of physical data such as seismic reflection amplitudes. The matrix is diagonalized, and then orthonormal basis vectors associated with insignificant diagonal elements are used to generate upper and lower bounds on the solution. Best and worst case solutions are determined as linear combinations of the null basis vectors, where the expansion coefficients are determined by making a best fit to the upper and lower bounds.

8 Claims, 2 Drawing Sheets

U.S. PATENT DOCUMENTS

| | | | |
|---|---|---|---|
| 6,092,033 | A | 7/2000 | Uhlmann |
| 6,173,240 | B1 | 1/2001 | Sepulveda et al. |
| 6,230,101 | B1 | 5/2001 | Wallis |
| 6,236,943 | B1 | 5/2001 | Aminzadeh et al. |
| 6,263,284 | B1 | 7/2001 | Crider et al. |
| 6,289,284 | B1 | 9/2001 | Yamamoto |
| 6,418,381 | B1 | 7/2002 | Fuller |
| 6,470,274 | B1 | 10/2002 | Mollison et al. |
| 6,473,696 | B1 | 10/2002 | Onyia et al. |
| 6,493,632 | B1 | 12/2002 | Mollison et al. |
| 6,529,833 | B2 | 3/2003 | Fanini et al. |
| 6,654,692 | B1 | 11/2003 | Neff |
| 6,674,432 | B2 | 1/2004 | Kennon et al. |
| 6,711,502 | B2 | 3/2004 | Mollison et al. |
| 6,715,551 | B2 | 4/2004 | Curtis et al. |
| 6,717,406 | B2 | 4/2004 | Sodickson |
| 6,718,265 | B2 | 4/2004 | Herron et al. |
| 6,734,185 | B2 | 5/2004 | Bakthavatchalam |
| 6,745,156 | B2 | 6/2004 | Cook |
| 6,751,558 | B2 | 6/2004 | Huffman et al. |
| 6,795,773 | B2 | 9/2004 | Soliman et al. |
| 6,832,160 | B2 | 12/2004 | Vinje |
| 6,901,333 | B2 | 5/2005 | Van Riel et al. |
| 6,904,365 | B2 | 6/2005 | Bratton et al. |
| 6,904,367 | B2 | 6/2005 | Cook et al. |
| 6,941,255 | B2 | 9/2005 | Kennon et al. |
| 6,952,649 | B2 | 10/2005 | Cook et al. |
| 6,959,246 | B2 | 10/2005 | Herron |
| 6,965,232 | B2 | 11/2005 | Sodickson |
| 6,970,397 | B2 | 11/2005 | Castagna et al. |
| 6,977,866 | B2 | 12/2005 | Huffman et al. |
| 6,987,385 | B2 | 1/2006 | Akkurt et al. |
| 6,988,056 | B2 | 1/2006 | Cook |
| 7,006,951 | B2 | 2/2006 | Pond, Jr. et al. |
| 7,043,413 | B2 | 5/2006 | Ward et al. |
| 7,072,767 | B2 | 7/2006 | Routh et al. |
| 7,111,681 | B2 | 9/2006 | Detournay et al. |
| 7,124,065 | B2 | 10/2006 | MacAuslan |
| 7,149,671 | B2 | 12/2006 | Lim et al. |
| 7,257,490 | B2 | 8/2007 | Georgi et al. |
| 7,260,508 | B2 | 8/2007 | Lim et al. |
| 7,277,795 | B2 | 10/2007 | Boitnott |
| 7,286,939 | B2 | 10/2007 | Bachrach et al. |
| 7,356,413 | B2 | 4/2008 | Georgi et al. |
| 7,359,550 | B2 | 4/2008 | Brand |
| 7,363,161 | B2 | 4/2008 | Georgi et al. |
| 7,369,973 | B2 | 5/2008 | Kennon et al. |
| 7,377,318 | B2 | 5/2008 | Detournay et al. |
| 7,472,588 | B2 | 1/2009 | Slavin et al. |
| 7,516,016 | B2 | 4/2009 | DeMartini et al. |
| 2002/0067373 | A1 | 6/2002 | Roe et al. |
| 2006/0025976 | A1 | 2/2006 | Kennon et al. |
| 2006/0153005 | A1 | 7/2006 | Herwanger et al. |
| 2006/0219402 | A1 | 10/2006 | Lecampion |
| 2007/0038420 | A1 | 2/2007 | MacAuslan |
| 2008/0031964 | A1 | 2/2008 | Messadek |
| 2008/0033656 | A1 | 2/2008 | Herwanger |
| 2008/0120034 | A1 | 5/2008 | Georgi et al. |
| 2008/0130407 | A1 | 6/2008 | Akhtar |
| 2008/0221800 | A1 | 9/2008 | Gladkikh et al. |
| 2009/0043554 | A1 | 2/2009 | Horne et al. |

OTHER PUBLICATIONS

Buland, A., et al., (1996), "AVO Inversion of Troll Field Data", Geophysics, v. 61, No. 6, pp. 1589-1602.

Fouquet, D.F., (1990), "Principles of AVO Processing", SEG Technical Program Expanded Abstracts, p. 1486.

Huston, D.C., et al., (1986), "Interpretation of Seismic Signal and Noise through Line Intersection Analysis", Society of Exploration Geophysicists Annual Meeting Abstracts, Session S10.7, pp. 501-503.

Huston, D.C., et al., (1989), "Offset Dependent Mis-Tie Analysis at Seismic Line Intersections", Geophysics, v. 54, No. 8, pp. 962-972.

Menke, W., (1984, 1989), "Geophysical Data Analysis: Discrete Inverse Theory", Academic Press, Inc., Rev. Edn., pp. 36-37, 52-56.

Landro, M. et al., (1995), "Target-Oriented AVO Inversion of Data from Valhall and Hod Fields", The Leading Edge, pp. 855-861.

Onslott, G.E., et al., (1984), "Color Display of Offset Dependent Reflectivity in Seismic Data", $5^{th}$ Annual International (SEG) Meeting, pp. 674-675.

Pan, G.S., et al., (1994), "An Integrated Target-Oriented Prestack Elastic Waveform Inversion: Sensitivity, Calibration and Application", Geophysics, v. 59, No. 9, pp. 1392-1404.

Sheriff, R.E., et al., (1995), "Exploration Seismology", Cambridge University Press, pp. 342.

Simmons, J.L., Jr., et al. (1996), "AVO Inversion and Direct Hydrocarbon Detection", Society of Exploration Geophysicists, Annual Meeting Abstracts, pp. 960-963.

Todd, C.P., et al., (1985), "Seismic Offset-Dependent Reflectivity", Society of Exploration Geophysicists, Annual Meeting Abstracts, pp. 586-588.

Wood, L., et al., (1988), "Partial-Stack Seismic Data", Society of Exploration Geophysicists, Annual Meeting Abstracts, pp. 775-779.

Wrolstad, K.H., (1988), "AVO Representations", Society of Exploration Geophysicists, Annual Meeting Abstracts, pp. 1355.

Aki, K. et al. (1980) "Plane Waves in Homogeneous Media and Their Reflection and Transmission at a Plane Boundary", *Quantitative Seismology Theory and Methods*, v.1, Chapter 5, pp. 123-192.

Lanczos, C. (1961) *Linear Differential Operators*, Chapter 3, pp. 111-113, Van Nostrand.

Malinverno, A. et al. (2004) "Expanded Uncertainty Quantification in Inverse Problems: Hierarchical Bayes and Empirical Bayes," *Geophysics*; v. 69, No. 4, pp. 1005-1016.

Mazzotti, A. et al. (2003) "Petrophysical Inversion of AVA Data," *Geophysical Prospecting*, v. 51, No. 6, pp. 517-530.

Menke, W. (1984) *Geophysical Data Analysis: Discrete Inverse Theory*, Academic Press, pp. 111-125.

Oldenburg, D. (1983) "Funnel Functions in Linear and Nonlinear Appraisal," *J. Geophs. Res.*, v. 88, No. B9, pp. 7387-7398.

Press, W. et al. (1992) *Numerical Recipes in C: The Art of Scientific Computing*, Cambridge University Press, pp. 59-70.

Rowbotham, P. et al. (1997) "Improved Inversion Through Use of the Null Space," *Geophysics SEG*, v. 62, No. 3, pp. 869-883.

Strang, G. (1993) *Introduction to Linear Algebra*, Wellesley-Cambridge Press, pp. 321-333.

Vasco, D. et al. (1993) "Ensemble Inference in Geophysical Inverse Problems," *Geophysical Journal International UK*, v. 115, No. 3, pp. 711-728.

EP Search Report No. 112979US, dated Mar. 3, 2006, 2 pages.

PCT Search and Written Opinion, dated Jan. 5, 2007, 8 pages.

METHOD FOR PREDICTING THE BEST AND WORST IN A SET OF NON-UNIQUE SOLUTIONS

This application claims the benefit of U.S. Provisional Application No. 60/698,760 filed on Jul. 13, 2005.

FIELD OF THE INVENTION

This invention relates generally to the field of geophysical modeling, although the invention has broader application. Specifically, the invention is a method for predicting best and worst solutions when model inversion yields non-unique solutions.

BACKGROUND OF THE INVENTION

In the oil industry, it is common to be faced with a set of data from which one wishes to infer some sort of information of interest. It is also fairly common that such inverse problems are non-unique, that is, different solutions explain the data equally well. While it is straightforward to obtain a single solution that the user considers "most likely", it is often desirable to know the "best" and "worst" case solutions that fit the data in addition to the "most likely" one, to adequately understand the risks of a given course of action. An example of this sort of problem in the oil industry is the prediction of the sand and porosity distribution in a reservoir where one would like to know the largest and smallest hydrocarbon volumes (i.e., the best and worst case scenarios) possible in addition to the "most likely". An accurate understanding of the potential risks involved in draining a potential reservoir should reduce total costs (correctly sized platforms, optimal draining strategy, etc.).

A common method for determining alternative scenarios is to do forward simulations of many different models in which the variables deemed to affect the final result are chosen at random from some pre-defined distribution. The forward models are then compared to the observed data to see which of the various forward models match. A distribution of the parameters fitting the data is then extracted from the set of models that are deemed to fit the data well. From this distribution, a best and worst case can, in principle, be determined. This method is time-consuming because it requires a large number of forward models. In addition, it suffers from user bias in that the only models tried are the ones that the user has thought of or deemed relevant.

Another method is to take the most likely model and simply scale it up and down by some amount and call that the best and worst case. This method produces results that generally do not match the observed data in a forward modeling sense and are not necessarily the "best" and "worst" case answers.

What is needed is a method in which the best and worst case scenarios are obtained as mathematical solutions to the inverse problem.

SUMMARY OF THE INVENTION

In one embodiment, the invention is a computer-implemented method for (see box 1 of the flowchart of FIG. 1) determining the largest and smallest of the possible solutions of a matrix equation that can be expressed in the form $$\begin{bmatrix} G \end{bmatrix} \begin{bmatrix} m_1 \\ m_2 \\ \vdots \\ m_N \end{bmatrix} = [\text{data}],$$

where $m_1 \ldots m_N$ are physical parameters to be solved for and G is a matrix based on a model of a physical system that relates the $m_i$ to measured data, wherein the equation may be non-uniquely inverted by numerical methods yielding an infinite number of possible solutions all of which fit the data substantially equally well and from which a most likely solution can be determined, said method comprising (a) finding (step 2 in FIG. 1) orthonormal basis vectors that diagonalize the G matrix, and using said vectors to diagonalize G; (b) selecting (step 3) a threshold below which the values of the elements of the diagonalized G are considered insignificant in terms of their effect on the most likely solution to said matrix equation; (c) identifying (step 4) from the orthonormal basis vectors those vectors (the "null" vectors) associated with the insignificant diagonal elements; (d) choosing (step 5) an $L_P$ mathematical norm where $p\epsilon[0, \infty]$; (e) determining (step 6) an upper and lower bound for possible solutions $m_1, m_2 \ldots m_N$ by summing corresponding components of said null vectors according to the chosen norm, said lower bound being given by the negative of said sums; (f) finding (step 7) a linear combination of the null vectors that most closely approaches said upper bound, and repeating this finding for said lower bound; and (g) adding (step 8) each of said two linear combinations in turn to the most likely solution to yield a largest and a smallest solution, scaling as needed to eliminate any physically unreal results.

BRIEF DESCRIPTION OF THE DRAWINGS

The present invention and its advantages will be better understood by referring to the following detailed description and the attached drawings in which:

FIG. 2B shows the most likely case.

Figure 1:
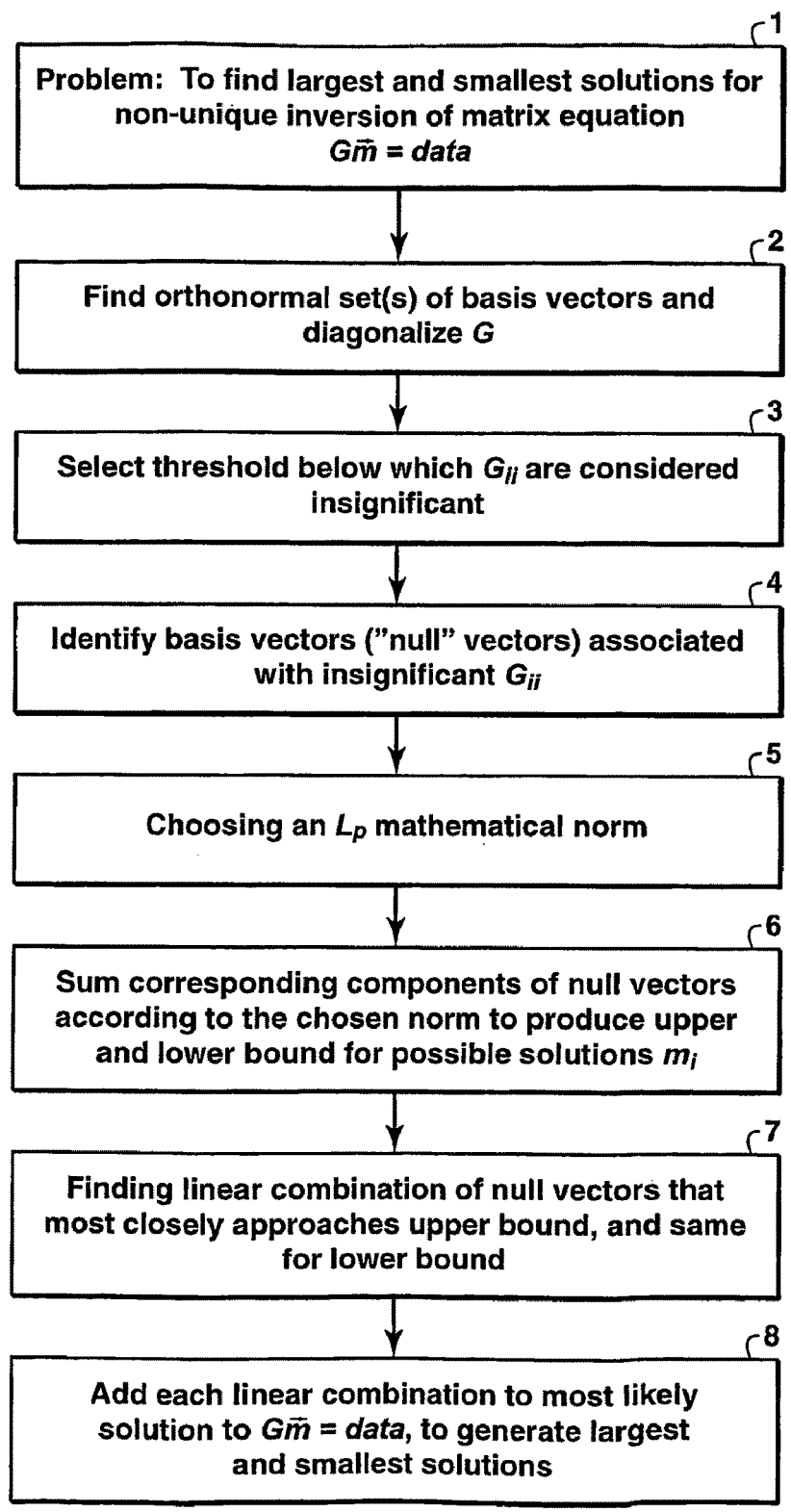
FIG. 1 is a flowchart showing basic steps in the present inventive method.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for obtaining the "best" and "worst" case solutions by solving a system of equations that relate the observations (data) to parameters of interest. For the lithology prediction problem mentioned above, these equations may, for example, include the convolutional equation, the Aki & Richards (1980) reflectivity equation, and a linearized, rock physics equation. (See U.S. patent application filed Jun. 24, 2005 by Saltzer, Finn and Lu.) In matrix notation, they take the following form:

$$\begin{bmatrix} G \end{bmatrix} \begin{bmatrix} \phi \\ vsh \end{bmatrix} = [data] \quad (1)$$

where φ and vsh are the porosity and vshale (shale volume fraction) values as a function of time, data are the seismic traces associated with different source receiver apertures and G is a matrix that relates the model parameters (vshale and porosity in this example application) to the data parameters, typically seismic reflection data. However, the invention may be applied to any physical system where a physical model exists to provide a G matrix that relates model parameters m to the measured or otherwise obtained data, in which general case eqn. (1) can be written as Gm=Data. The G matrix may be partioned into two pieces: a first region characterized by sensitivity of the data to the model parameters and a second region with little sensitivity. These two regions are found by defining orthonormal bases that diagonalize the G matrix. Once these bases have been found, a cut-off value is chosen below which the elements of the diagonalized G matrix are insignificant. The orthonormal vectors associated with these insignificant components of the diagonalized G matrix are the "null" vectors. Thus if the basis vectors are $u_k$ and $v_k$, they can be used to construct matrices U and V such that G=USV' where S has non-zero elements only on its diagonal. Persons familiar with linear algebra will know that the matrix S, which may be called the diagonalized G matrix, can be found. Typically, G and hence S will not be a square matrix, but the elements $G_{i,j}$ and $S_{i,j}$ are considered to be diagonal elements when i=j. If the diagonal elements of S are called $\lambda_1, \lambda_2, \ldots \lambda_N$, and if $\lambda_k$ is below the threshold selected for significance, then $v_k$ is a null vector. Mathematically, the null vectors correspond to the $$Gm=0 \quad (2)$$

solutions (as stated above, m is a column matrix or vector whose components are φ and vsh values in the embodiment represented by eqn. (1)). Consequently, they can be added to the "most likely" solution without changing the fit of that model to the measured data, because they do not project onto the data space. An underlying theory of the present invention is that the infinite number of solutions that fit the data almost equally well due to the non-uniqueness of the solution can be regarded as perturbations of the most likely solution, and that the perturbations are driven by the different possible linear combinations of the null vectors that can be constructed. This follows from the fact that the null vectors are a basis set of vectors spanning a portion of the relevant space. Thus, the part of the equation that does not affect the most likely solution in fact causes the differences between any given solution and the most likely solution.

The problem then becomes one of finding the combination of null vectors ($\vec{v}_k$) that will yield the greatest porosity and sand volumes ($\vec{m}_{biggest}$). This can be expressed mathematically as $$\vec{m}_{biggest} = \sum_k \alpha_k \vec{v}_k^{null} \quad (3)$$

where ($\alpha_k$) is a vector of coefficients that weight the relative importance of each null vector. If the best possible model ($\vec{m}_{biggest}$) of the subsurface is known a priori, it is a simple matter to obtain a least squares solution of the appropriate weighting factors ($\alpha_k$). The more difficult part is determining the upper bound on the porosity and vshale perturbations (i.e., knowing what model of $\vec{m}_{biggest}$ to solve for).

The upper bound of possible perturbations ($\vec{m}_{biggest}$) can be determined by summing the elements or components of the orthonormal basis vectors that are associated with the portion of the diagonalized G matrix that have been determined to be insignificant (the null vectors $v_k$). This summing operation is done according to the particular norm chosen to apply. An $L_1$ norm is computed with the absolute values of the of the elements of the relevant orthonormal vectors $$\vec{m}_{biggest} = \sum |\vec{v}_k| \quad (4)$$

(i.e. the absolute value of the first element of each null vector is added to make the first element of the perturbation vector and the absolute value of the second element of each null vector is added to make the second element, etc.) whereas an $L_2$ norm is the computed using the square of the same elements. An $L_3$ norm is computed using the cube of the absolute values of the components and so on for p∈[0, ∞]. An $L_\infty$ norm would use the maximum, absolute value of the same elements (i.e., the maximum of the first element of each null vector is taken as the first element of the perturbation vector and the maximum of the second element of each vector is taken as the second element, etc.). The lower bound is the negative of the sum computed for the upper bound. Next, one solves eqn. (3) for the combination of null vectors that most closely approaches that upper (lower) bound and finishes by scaling the resulting perturbation vector by a constant and adding that result to the most likely solution. Persons skilled in the art will know methods for finding a most likely, or best guess, solution to matrix equations of the form of eqn. (1). For example, Menke describes standard inversion methods in *Geophysical Data Analysis: Discrete Inverse Theory*, Academic Press (1984). The scaling serves to prevent unphysical results, and preferably is performed in increments in iterative fashion until just enough scaling has been applied to prevent physically unreal values of the parameters $m_i$. A priori information may favor stronger scaling in particular instances.

This method is applicable to any problem where an appropriate physical model can be used to describe the relationship between what is observed and what is to be inferred. For example, if the differences in AVO behavior observed over time (time-lapse seismic) can be related to changes in pressure and water saturation in the reservoir, then the null space method can be used to solve for the "best" and "worst" case scenarios possible, given the observed differences between the seismic data. Another possible application is production history data from which the best and worst case reservoir permeability might be inferred. Typically well logs are processed and a single best answer (e.g., the vshale log) is produced. However, this null space methodology could be used in a joint inversion of different well log data for some property of interest (e.g. permeability, water saturation, etc.) to produce the best and worst case logs possible, given whatever data was actually recorded. In constructing the G matrix, anisotropy terms can be included in the reflectivity and rock physics equations when determining the porosity and sand distribution in a reservoir. Alternatively, the equations can be parameterized in terms of other properties of interest (e.g., elastic properties such as impedances or velocities).

In some embodiments of the invention, a singular value decomposition (SVD) is used to decompose the G matrix into the two subspaces of interest. Such a decomposition is described in various textbooks including G. Strang, *Introduction to Linear Algebra*, Wellesley-Cambridge Press, 321-333 (1993); C. Lanczos, *Linear Differential Operators*, Van Nostrand, (1961); the previously cited book by Menke; and Press, et al., *Numerical Recipes in C: the art of scientific computing*, Cambridge University Press, 1992. This operation produces two orthogonal matrices, U and V, that contain the data and model eigenvectors and a third matrix, S, that contains the singular values (eigenvalues). Then the following steps are performed:

1. sum the absolute values of the components of the null space eigenvalues (an $L_1$ norm choice). This sum is made across corresponding elements of every eigenvector (along the rows of the eigenvector matrix) and is equivalent to determining an upper bound on the total perturbations that can be wrung from the data. The lower bound is the negative of this sum.
2. choose a shale cut-off value. Elements of the perturbation vector corresponding to values above this cut-off in the most likely solution are excluded from step 3.
3. solve for the combination of eigenvectors that most closely approaches that upper (lower) bound.
4. scale the resulting perturbation vector by a constant and add that result to the most likely solution. In the lithology problem, the scaling constant is chosen such that the final porosity and vshale values obtained are physically real (neither porosity or vshale is less than 0% and vshale is not greater than 100% and porosity is not greater than 40%).

The commercial software product "Matlab" (www.mathworks.com) readily decomposes, using singular value decomposition, a given matrix G into two orthonormal matrices U and V and a diagonal matrix S, i.e., G=USV'. S contains the singular values (the eigenvalues of G'G), U contains the orthonormal basis vectors that are associated with the data space, and V contains the orthonormal basis vectors that are associated with the model space. (Recall that G relates the model parameters to the data parameters.) The book by Press, et al., contains a source code listing of a similar computer program. Typically, an SVD algorithm will generate an S matrix having its diagonal elements ordered from largest to smallest. It is then a simple matter to select a cutoff value and to select the basis vectors from the V matrix associated with the values below the cutoff. Those vectors will appear in V as consecutive columns, and one simply sums the corresponding components of these column vectors using whatever norm has been selected. The invention will work with any norm.

Example

Figure 2C:
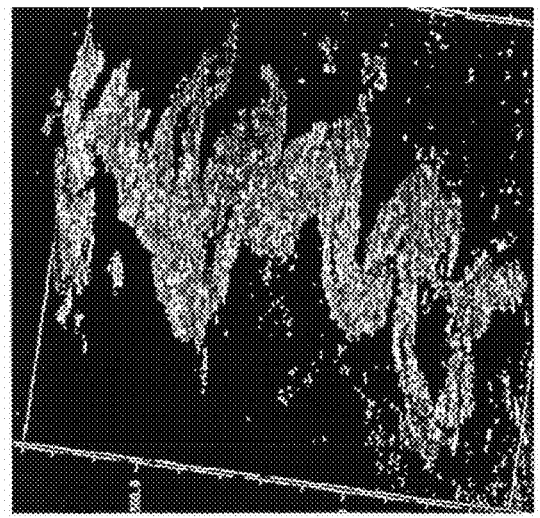
FIGS. 2A-C are pictures of 3-D images produced by the present inventive method showing the "worst" case (2A) and "best" case (2C) scenarios for sand bodies in an inverted vshale volume, where
Figure 2B:
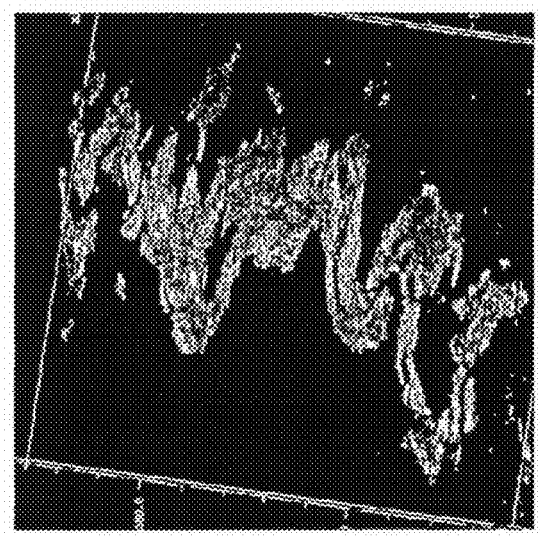
Figure 2A:
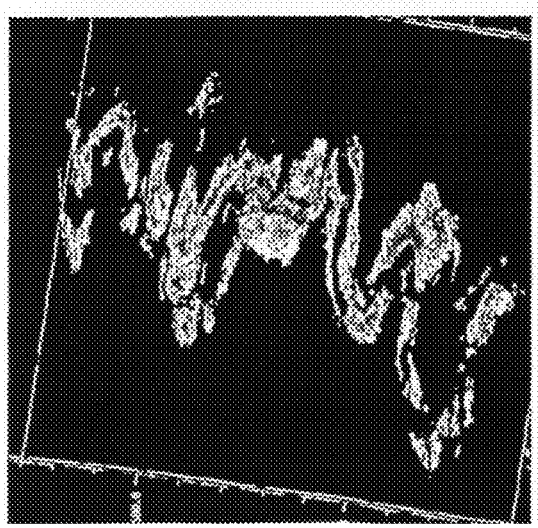

The present inventive method was applied to some seismic data acquired over a potential oil field. FIGS. 2A-C show a 3-D image on a black background of, respectively, the "worst," "most-likely," and "best" inferred (1—vshale) sand channel winding through a inverted vshale volume (the shaly parts have been made invisible). The estimates of total reserves carried in the "best" and "worst" case scenarios varies by almost a factor of two. In addition, the difference in connectedness between the sand bodies in the "worst" and "best" cases are significantly different and imply different draining strategies that might be optimal for this field.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. In the problem of inverting a matrix equation that can be expressed in the form $$\begin{bmatrix} G \end{bmatrix} \begin{bmatrix} m_1 \\ m_2 \\ \vdots \\ m_N \end{bmatrix} = [\text{data}],$$

where $m_1 \ldots m_N$ are physical parameters to be solved for and G is a matrix based on a model of a physical system that relates the $m_i$ to measured data, expressed as components of vector [data] in the equation, wherein the equation may be non-uniquely inverted by numerical methods yielding an infinite number of possible solutions all of which fit the data substantially equally well and from which a most likely solution can be determined, a computer implemented method for determining the largest and smallest of said possible solutions, said method comprising:

(a) finding orthonormal basis vectors that diagonalize the G matrix, and using said vectors to diagonalize G;

(b) selecting a threshold below which the values of the elements of the diagonalized G are considered insignificant in terms of their effect on the most likely solution to said matrix equation;

(c) identifying from the orthonormal basis vectors those vectors (the "null" vectors) associated with the insignificant diagonal elements;

(d) choosing an $L_P$ mathematical norm where $p \in [0, \infty]$;

(e) determining an upper and lower bound for possible solutions $m_1, m_2 \ldots m_N$ by summing corresponding components of said null vectors according to the chosen norm, said lower bound being given by the negative of said sums;

(f) finding a linear combination of the null vectors that most closely approaches said upper bound, and repeating this finding for said lower bound; and (g) adding each of said two linear combinations in turn to the most likely solution to yield a largest and a smallest solution, scaling as needed to eliminate any physically unreal results;

wherein at least one of (a), (c), (e), and (f) is performed using a computer.

2. The method of claim 1, wherein the $m_i$ are values of porosity and shale volume fraction, and the data are seismic amplitude values.

3. The method of claim 1, wherein singular value decomposition is used to find the orthonormal basis vectors and to diagonalize the G matrix.

4. The method of claim 3, wherein G is a non-square matrix, and said orthonormal basis vectors are two different sets of basis vectors, one set associated with the data vector's space and the other set associated with the m vector's space, and wherein the null vectors come from the basis vectors associated with the m vector's space.

5. The method of claim 1, wherein the absolute values of the corresponding components of the null vectors are summed, corresponding to choosing an $L_1$ norm.

6. The method of claim 1, wherein finding said linear combination of null vectors is solving the equation $$\vec{m}_{biggest} = \sum_k \alpha_k \vec{v}_k^{null}$$

for weighting factors $\alpha_k$ using a least squares method, where $\vec{v}_k^{null}$ is the k$^{th}$ null vector and $\vec{m}_{biggest}$ is a bound for possible m solutions.

7. A method of producing hydrocarbons from a subterranean region, comprising:
   (a) obtaining measured data from a seismic survey of the subterranean region;
   (b) obtaining a model of the subterranean region that relates physical parameters $m_i$ of the subsurface region to measured seismic data;
   (c) obtaining a matrix equation of the form $$\begin{bmatrix} G \end{bmatrix} \begin{bmatrix} m_1 \\ m_2 \\ \vdots \\ m_N \end{bmatrix} = [\text{data}]$$

relating the $m_i$ to the measured data, expressed as components of vector [data] in the equation, where G is a matrix based on said model;
   (d) obtaining a largest solution and a smallest solution among possible non-unique solutions for the $m_i$ from inverting the matrix equation, said largest and smallest solutions having been obtained by:
      (i) finding orthonormal basis vectors that diagonalize the G matrix, and using said vectors to diagonalize G;
      (ii) selecting a threshold below which the values of the elements of the diagonalized G are considered insignificant in terms of their effect on the most likely solution to said matrix equation;
      (iii) identifying from the orthonormal basis vectors those vectors (the "null" vectors) associated with the insignificant diagonal elements;
      (iv) choosing an $L_P$ mathematical norm where $p \in [0, \infty]$;
      (v) determining an upper and lower bound for possible solutions $m_1, m_2 \ldots m_N$ by summing corresponding components of said null vectors according to the chosen norm, said lower bound being given by the negative of said sums;
      (vi) finding a linear combination of the null vectors that most closely approaches said upper bound, and repeating this finding for said lower bound; and
      (vii) adding each of said two linear combinations in turn to the most likely solution to yield a largest and a smallest solution, scaling as needed to eliminate any physically unreal results;
   wherein at least one of (i), (iii), (v), and (vi) is performed using a computer; and
   (e) using said largest and smallest solutions to develop production of hydrocarbons from the subterranean region.

8. The method of claim 7, wherein the $m_i$ are values of porosity and shale volume fraction, and the data are seismic amplitude values.

* * * * *